US012793417B2

(12) United States Patent
Md Abdul et al.

(10) Patent No.: US 12,793,417 B2
(45) Date of Patent: Nov. 10, 2026

(54) METHOD AND SYSTEM FOR REAL-TIME ACTIVE SPEAKER DETECTION

(71) Applicant: Lenovo (Singapore) Pte. Ltd., Singapore (SG)

(72) Inventors: Mannan Md Abdul, Kanagawa (JP); Qiang Yao, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 248 days.

(21) Appl. No.: 18/624,381

(22) Filed: Apr. 2, 2024

(65) Prior Publication Data

US 2025/0308235 A1 Oct. 2, 2025

(51) Int. Cl.
*G06V 20/40* (2022.01)
*G06V 10/82* (2022.01)
(Continued)

(52) U.S. Cl.
CPC .............. *G06V 20/41* (2022.01); *G06V 10/82* (2022.01); *G06V 40/10* (2022.01); *G10L 25/30* (2013.01); *G10L 25/57* (2013.01); *G10L 25/78* (2013.01)

(58) Field of Classification Search
CPC ......... G01L 17/00; G01L 25/30; G01L 25/57; G01L 25/78; G06V 20/41; G06V 40/10; G06V 10/82
See application file for complete search history.

(56) References Cited

U.S. PATENT DOCUMENTS

| | | | | |
|---|---|---|---|---|
| 10,846,522 | B2 * | 11/2020 | Chaudhuri | G10L 25/24 |
| 2005/0243167 | A1 * | 11/2005 | Clarke | H04N 7/147 348/14.07 |

(Continued)

FOREIGN PATENT DOCUMENTS

| | | | |
|---|---|---|---|
| JP | 2005510144 | A | 6/2010 |
| JP | 2013182150 | A | 9/2013 |

(Continued)

OTHER PUBLICATIONS

Roth, et al. (AVA Active Speaker: An Audio Visual data Set for Active Speaker Detection), IEEE, pp. 4492-4496. (Year: 2020).*

(Continued)

*Primary Examiner* — Daniel G Mariam
(74) *Attorney, Agent, or Firm* — Osha Bergman Watanabe & Burton LLP

(57) ABSTRACT

An active speaker detection (ASD) system includes a visual sensor that captures a visual scene including a first person. The ASD system further includes a computer system including an audiovisual encoder and a classifier. The computer system is configured to obtain a first set of frames and a second set of frames from the visual sensor and to produce a first embedding and a second embedding from the first set of frames and the second set of frames, respectively, using the audiovisual encoder. The computer is further configured to generate one or more composite embeddings from the first embedding and the second embedding and determine, using the classifier, an ASD score for each of the one or more composite embeddings. The computer is further configured to aggregate the one or more ASD scores forming a detection result and determine whether the first person is speaking based on the detection result.

17 Claims, 8 Drawing Sheets

(51) Int. Cl.

| | |
|---|---|
| ***G06V 40/10*** | (2022.01) |
| ***G10L 25/30*** | (2013.01) |
| ***G10L 25/57*** | (2013.01) |
| ***G10L 25/78*** | (2013.01) |

(56) References Cited

U.S. PATENT DOCUMENTS

| | | | | |
|---|---|---|---|---|
| 2020/0117887 | A1 | 4/2020 | Chaudhuri et al. | |
| 2024/0134597 | A1* | 4/2024 | Dontcheva ............ | G06F 3/0484 |

FOREIGN PATENT DOCUMENTS

| | | | |
|---|---|---|---|
| JP | 2021021749 | A | 2/2021 |
| JP | 2024032655 | A | 3/2024 |
| WO | 2022130471 | A1 | 6/2022 |

OTHER PUBLICATIONS

Tesema, et al. (Efficient Audiovisual Fusion for Active Speaker Detection), IEEE, pp. 45140-45153. (Year: 2023).*

Extended European Search Report issued in corresponding European Patent Application No. 25162194.2, dated Jul. 4, 2025 (8 pages).

* cited by examiner

METHOD AND SYSTEM FOR REAL-TIME ACTIVE SPEAKER DETECTION

BACKGROUND

A visual scene including one or more speakers, such as a video that may be acquired with one or more cameras, can be enhanced by identifying an active speaker and modifying a display of the visual scene accordingly. For example, the display can be adapted to frame or depict only an active speaker, once identified among the one or more persons captured in the visual scene. Algorithms, generally under the classification of machine-learned models, have been developed to detect an active speaker using one or more of audio data and visual data, where any combination of audio data and visual data can be referred to collectively as audiovisual data. However, the accuracy of such methods is inversely proportional to the time required to computationally process the audiovisual data.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to an active speaker detection system including a visual sensor that captures a visual scene including a first person and a computer system. The computer system includes one or more computer processors and a detection model. The detection model includes an audiovisual encoder and a classifier. The computer system is communicably coupled to the visual sensor and configured to obtain a first set of frames and a second set of frames from the visual sensor and produce a first embedding and a second embedding from the first set of frames and the second set of frames, respectively, using the audiovisual encoder. The computer system is further configured to generate one or more composite embeddings from the first embedding and the second embedding and to determine, using the classifier, an active speaker detection (ASD) score for each of the one or more composite embeddings. The computer system is further configured to aggregate the one or more ASD scores forming a detection result, determine whether the first person is speaking based on the detection result, and upon determining that the first person is speaking, adjust a display of the visual scene to focus on the first person.

In general, in one aspect, embodiments relate to a method for determining whether a person is speaking in a visual scene including a first person. The method includes obtaining a first set of frames and a second set of frames from a visual sensor that captures the visual scene and producing, with an audiovisual encoder, a first embedding and a second embedding from the first set of frames and the second set of frames, respectively. The method further includes generating one or more composite embeddings from the first embedding and the second embedding and determining, using a classifier, an active speaker detection (ASD) score for each of the one or more composite embeddings. The method further includes aggregating the one or more ASD scores forming a detection result, determining whether the first person is speaking based on the detection result, and adjusting a display of the visual scene to focus on the first person in response the determination that the first person is speaking.

In general, in one aspect, embodiments relate to a non-transitory computer-readable medium with computer-executable instructions that, when executed on a computer processor, cause the computer processor to perform various steps. The steps include obtaining a first set of frames and a second set of frames from a visual sensor that captures a visual scene, where the visual scene includes a first person. The steps further include producing, with an audiovisual encoder, a first embedding and a second embedding from the first set of frames and the second set of frames, respectively. The steps further include generating one or more composite embeddings from the first embedding and the second embedding and determining, using a classifier, an active speaker detection (ASD) score for each of the one or more composite embeddings. The steps further include aggregating the one or more ASD scores forming a detection result, determining whether the first person is speaking based on the detection result, and adjusting a display of the visual scene to focus on the first person in response the determination that the first person is speaking.

DETAILED DESCRIPTION

Figure 1:
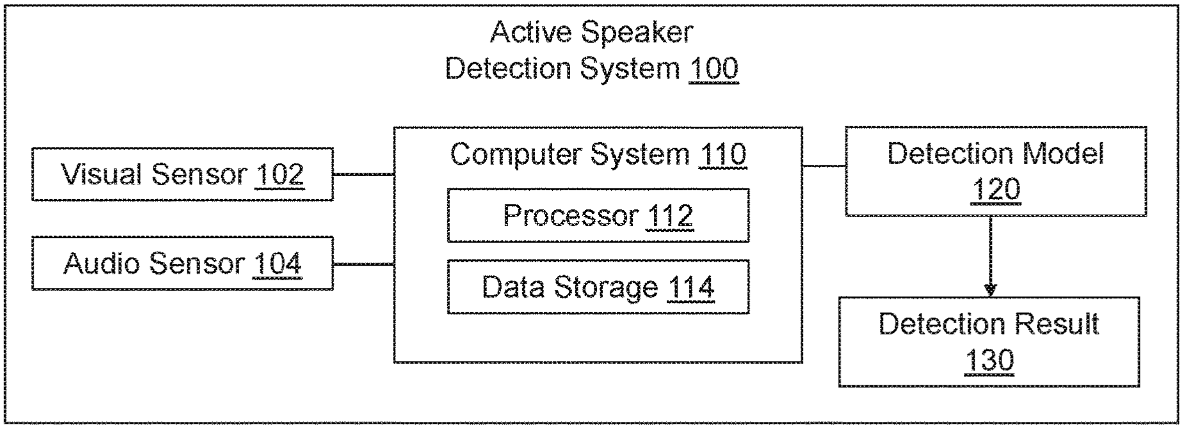
FIG. 1 depicts an active speaker detection system in accordance with one or more embodiments of the disclosure.

Specific embodiments of the present disclosure will now be described in detail below with reference to the accompanying drawings. Like elements in the various figures are denoted by like reference numerals for consistency.

In the following detailed description of embodiments of the disclosure, numerous specific details are set forth to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (e.g., any noun in the application). The use of ordinal numbers is not intended to imply or create a particular ordering of the elements nor to limit any element to being only a single element unless expressly disclosed, such as using the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

Embodiments disclosed herein generally relate to an active speaker detection (ASD) system and method of its use. ASD is the task of detecting who is speaking in a visual scene of one or more persons, where each person can be a candidate for an active speaker. In general, at any moment in a visual scene, no person may be speaking, a single person may be speaking, or more than one person may be speaking at the same time. Detecting active speakers in a visual scene (e.g., a video acquired with at least one camera) is useful across applications like content creation and video conferencing. Various ASD methods or algorithms have been proposed. These algorithms or methods detect an active speaker using one or more of audio data and visual data. Herein, the term "audiovisual data" is used to refer to audio data, visual data, or a combination of audio data and visual data. Therefore, an ASD algorithm or method may be said to determine one or more active speakers in a visual scene by processing audiovisual data associated with that visual scene.

Although determining an active speaker among a number of possible speakers is typically an easy task among human actors, implementing this behavior algorithmically is difficult. Intuitively, at least from a human perspective, determining whether a given person is speaking is easier with greater temporal context. For example, it is easier to determine whether a person is speaking upon hearing or observing the person for 30 seconds than when only hearing or observing the person for one second. As such, advances in algorithmic ASD have involved the use of temporally longer sequences of data (e.g., a sequence of images or frames forming a video and, in some instances, associated audio) to include greater temporal information. While accuracy is improved by processing longer sequences of audiovisual data, processing such long sequences is computationally expensive and probative to real-time active speaker determination. For example, an ASD algorithm operating on relatively long sequences of audiovisual data may require more than three minutes to process a video clip with a duration of one and a half minutes. In other words, with respect to ASD, there is a tradeoff between accuracy and speed, where the use of longer sequences are associated with improved accuracy (in alignment with intuition and human observation) but require additional processing time.

Generally, audiovisual data is composed of a sequence of ordered frames (e.g., images) and, in some instances, associated audio where the audio may also be segmented to associate an audio segment with a frame or image (usually on a one-to-one basis). The sequence of frames and/or audio is ordered according to time. As such, a sequence of audiovisual data can have a stated length according to the number of frames in the sequence or the period of time that the sequence requires for playback when its frames are displayed at a predefined frame rate. A sequence of frames forming audiovisual data can simply be referred to as audiovisual data or audiovisual data with a specified length (e.g., 50 frames). Further, audio visual data can be segmented, or spliced or partitioned, into different sequences of varying length. For example, audiovisual data with a length of 50, where each frame is indexed using a numeric value between 1 and 50, can be segmented into two different sequences of audiovisual data each having a length of 25 frames (e.g., a first audiovisual data composed of frames 1 to 25 and a second audiovisual data composed of frames 26 to 50, with respect to the indexing of the frames according to the original audiovisual data with a length of 50 frames).

It is not uncommon for ASD algorithms to have reported computational time complexities proportional to the number of frames in the audiovisual data on which the ASD algorithm is operating. That is, using Big-O notation, an ASD algorithm may have a time complexity of $O(n)$ where $n$ is the number of frames in the provided audiovisual data. With this consideration, the tradeoff between accuracy and required computation time (or speed) is clearly demonstrated, where an increase in the length of audiovisual data to provide greater temporal context, and thus greater accuracy in detecting active speaker(s), is associated with an increase in computation time proportional to the length of the audiovisual data. As will be demonstrated herein, the ASD system according to one or more embodiments allows for the incorporation of greater temporal context without a prohibitive increase (if any increase) in computation time. Thus, embodiments disclosed herein can detect the active speakers of a visual scene from audiovisual data with high accuracy in real-time.

FIG. 1 depicts an ASD system (100) in accordance with one or more embodiments. The ASD system (100) includes a visual sensor (102), for example, one or more cameras. The visual sensor (102) can have a field of view (FOV). Field of view is used herein as a general term intended to indicate the extent of the observable world that is seen by a visual sensor (102) (e.g., a camera). The visual sensor (102) can capture a visual scene including one or more persons, where any of the persons may or may not be actively speaking at any given time. The visual sensor (102) captures the visual scene as visual data composed of a sequence of frames, each frame representative of the visual scene at an instance in time. The ASD system (100) includes an audio sensor (104), for example, a microphone or array of vibrational sensors. In general, the audio sensor (104) converts sound waves into an electrical signal, i.e., a time-series of discretized amplitudes representing the sound wave. The audio sensor (104) can capture the sound of its environment, including the sound of the visual scene captured by the visual sensor (102). The captured sound or electrical signal generated by the audio sensor (104) may be referred to as audio data (204). Audiovisual data contains at least one of audio data and visual data. The visual sensor (102) and the audio sensor (104) are enclosed by a single device or subsystem and are considered the same sensor. For example, a camera may be configured to capture both images and sound associated with a visual scene acting as both the visual sensor (102) and the audio sensor (104).

Keeping with FIG. 1, the ASD system (100) includes a computer system (110) communicatively coupled to the visual sensor (102) and the audio sensor (104) and configured to receive and process audiovisual data. The computer system (110) includes one or more computer processors (112) and data storage (114) such as one or more of a non-persistent storage (e.g., volatile memory, such as random access memory (RAM), cache memory) and a persistent storage (e.g., a hard disk, an optical drive such as a compact disk (CD) drive or digital versatile disk (DVD) drive, a flash memory, etc.). The processor (112) may be part or all of an integrated circuit for processing instructions. For example, the processor (112) may be or include one or more cores or micro-cores. The computer system (110) further includes a communication interface (not depicted), which may include an integrated circuit for connecting to a network (not shown) (e.g., a local area network (LAN), a wide area network (WAN) such as the Internet, mobile network, or any other type of network) and/or to another device, such as the visual sensor (102) and the audio sensor (104).

Software instructions configured to perform one or more embodiments of the disclosure may be stored on a non-transitory computer-readable storage medium. The software instructions can include instructions to perform embodiments of the disclosure such as processing audiovisual data, with a detection model (120), described later, to detect or determine an active speaker in a visual scene. The non-transitory computer-readable medium may be, for example, a CD, DVD, flash memory, or storage device. In one or more embodiments, the non-transitory computer-readable medium is the data storage (114) of the computer system (110). In other embodiments, the computer system (110) is configured to access, read, and execute the software instructions as stored on the non-transitory computer-readable medium. Further, the software instructions may be stored in whole or in part, temporarily or permanently, on the non-transitory computer readable medium.

The ASD system (100) includes a detection model (120). The detection model (120) may be stored, for example, on the data storage (114) or as part of a non-transitory computer-readable medium. The detection model (120) accepts audiovisual data, or a segment of audiovisual data, and returns a detection result (130), where the detection result identifies one or more active speakers (or lack of any active speaker) in a visual scene at instances in time. For example, a visual scene may include the interaction of four persons A, B, C, and D over a period T, where at any instance in the period zero or more of persons A, B, C, and D may be actively speaking. The visual scene over the period T is represented as audiovisual data acquired using one or more of a visual sensor (102) and an audio sensor (104). The audiovisual data may be composed of N frames over the period T. The detection result includes a score for each person at each frame, where the score is indicative of whether the associated person is actively speaking at the instance of the associated frame. The score may be a categorical variable or a continuous-valued variable. In one example, the score is a binary classification with the classes being "actively speaking" and "not actively speaking." In another example, the score is a non-binary classification, for example, using the classes "actively speaking," "not actively speaking," and "undetermined." In yet another example, the score is a continuous variable in the range [0,1] and indicates the probability that a person is actively speaking. The detection model (120) processes audiovisual data and returns a detection result (130), the detection result (130) indicative of a speaking status of persons in a visual scene represented by the audiovisual data.

The detection model (120), which may be implemented using the computer system (110), includes one or more machine-learned models and may further encompass various pre- and post-processing steps. Machine learning (ML), broadly defined, is the extraction of patterns and insights from data. Thus, in some implementations, a machine-learned model determines a result such as a prediction or detection, based on a perceived pattern in received data.

Figure 2:
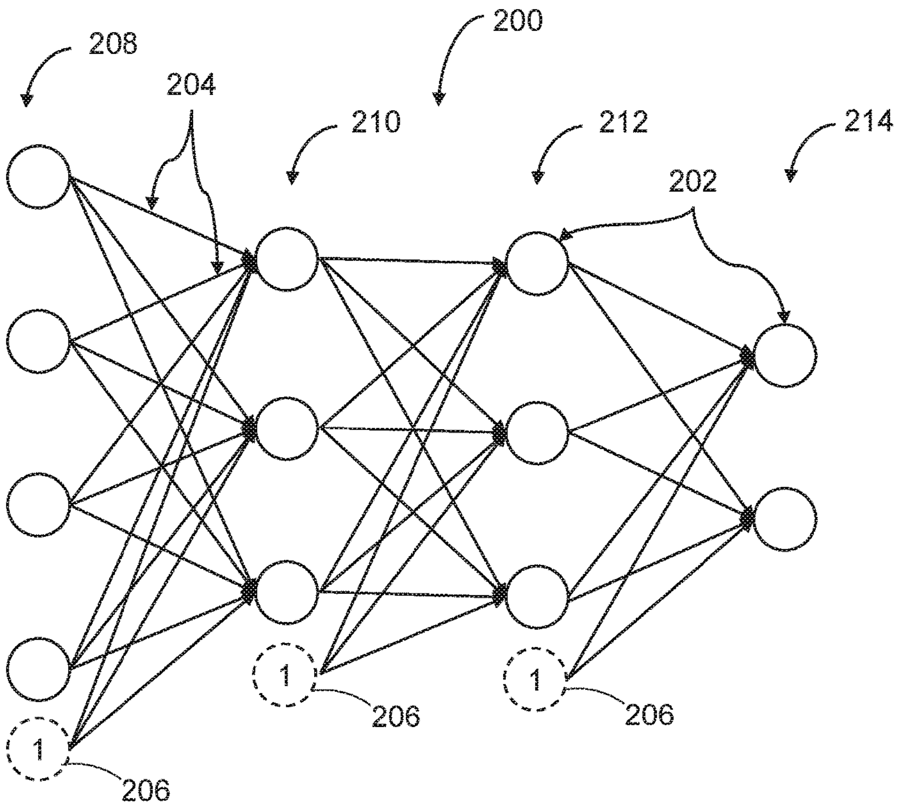
FIG. 2 depicts a neural network in accordance with one or more embodiments of the disclosure.

One type of machine-learned model is a neural network. A neural network (200) as depicted in FIG. 2 may be used as a subcomponent of a larger machine-learned model such as the detection model (120). The neural network (200) is depicted here as a graph composed of nodes (202) and edges (204). The nodes (202) are represented as solid circles and, to avoid cluttering the figure, not all nodes are given a numeric label. Similarly, edges (204) are depicted as solid lines. In general, the edges (204) of a neural network (200) are "directed" such and the neural network (200), borrowing from the language of graphs, can be categorized as a directed acyclic graph (DAG). As such, the edges (204) in FIG. 2 are more specifically depicted as directed lines. Again, to avoid cluttering the figure, not all depicted edges (204) are given numeric labels.

The nodes (202) may be grouped to form layers. FIG. 2 displays four layers (208, 210, 212, 214) of nodes (202) where each layer consists of a columnar grouping of nodes (202). In general, the grouping of nodes (202) and formation of layers need not be as depicted in FIG. 2. For example, edges (204) may connect, or not connect, to any node(s) (202) regardless of which layer the node(s) (202) is in. That is, edges (204) may form sparse and residual connections between nodes (202) (e.g., so-called "skip" connections). In instances where every node (202) in a layer is connected to every node in an adjacent layer, the layer and the adjacent layer are said to be fully or densely connected. In the neural network (200) of FIG. 2, all of its layers are densely connected to their adjacent layers, where applicable. As such, the neural network (200) of FIG. 2 may be said to be a fully connected or a densely connected neural network (200).

A neural network (200) will have at least two layers, namely, an "input layer" (208) and an "output layer" (214). Zero or intermediate layers (210, 212) may reside between the input layer (208) and the output layer (214). Commonly, an intermediate layer (210, 212) is referred to as a "hidden layer." Further, a neural network (200) with at least one hidden layer (210, 212) may be described as a "deep" neural network or a "deep learning method." In some embodiments, and as will be described later, the detection model (120) includes a deep neural network. The output layer (214) of a neural network (200) can have more than one node (202). In instances where the output layer (214) of a neural network (200) has more than one node (202), the neural network (200) may be referred to as a "multi-target" or "multi-output" network.

Further, each edge (204) in a neural network (200) is associated with a numerical value. The numerical value of an edge (204), or even the edge (204) itself, is often referred to as a "weight" or a "parameter." As such, a neural network (200) may be said to contain or be parametrized by a set of weights or parameters. The neural network (200) is "trained" by assigning, through evaluation of a set of data commonly referred to as training data (described below), a numerical value to each trainable edge of the neural network (200). Here, the distinction "trainable edge" is introduced where a trainable edge is an edge in which its numerical value can be adjusted during the training routine. In general, non-trainable edges have numerical values but their values are determined using a different process than the training processing, for example, direct assignation by a user.

Similarly, nodes (202) carry, pass, or temporarily store a numerical value and are further associated with an activation function. Activation functions are not limited to any functional class, but traditionally apply a function to the dot product of an array of values of nodes ("incoming nodes") that are connected, or directed to, the node where the activation function is to be applied ("activation node"), and an array of the weights or parameters of the edges that connect the incoming nodes to the activation node. Incoming nodes (202) are those that, when viewed as a graph (as in FIG. 2), have directed arrows that point to the activation node where the numerical value for the activation node is being computed. Some commonly used activation functions are the linear function $f(x)=x$, sigmoid function $$f(x) = \frac{1}{1+e^{-x}},$$

and rectified linear unit function $f(x)=\max(0, x)$, but other functions can be used without limitation. Every node (202) in a neural network (200) can have its own activation function that can be the same or different from the activation function of any other node (202).

When the neural network (200) receives an input, the input is propagated through the network according to the activation functions of the nodes (202) of the neural network (200) and edge (204) values of the neural network (200). As such, the numerical value of a node (202) may change for each received input. Occasionally, nodes (202) are assigned fixed numerical values, such as the value of 1, that are not affected by the input. Nodes (202) with fixed numerical values (invariant to the input) are often referred to as "biases" or "bias nodes" (206), illustrated in FIG. 2 with a dashed circle.

In some implementations, the neural network (200) may contain specialized layers, such as a normalization layer, dropout layer, and concatenation layer. For concision, such layers are not discussed herein, however, one with ordinary skill in the art will recognize that the inclusion and usage of such layers with the neural network (200) do not exceed the scope of this disclosure.

As noted, the process of training the neural network (200) consists of, at least, assigning values to the edges (204) of the neural network (200). Training commences using a neural network (200) with edge values initially provided through some initialization mechanism or procedure. The edge values may be assigned randomly, assigned according to a prescribed distribution, assigned manually, or by some other assignment procedure. With initial edge values, the neural network (200) may be said to act as a function receiving and input and producing an output. As such, one or more inputs can be propagated through the neural network (200) to produce one or more associated outputs. During training, a training set or training data is provided to the neural network (200). The training set is composed of inputs and associated target(s), where the target(s) represent a desired output, often an observed value or a "ground truth" that accompanies an observed input. During training, the neural network (200) processes the inputs to produce outputs and the outputs are compared to the associated targets. The comparison of the neural network produced output to a target is performed using a "loss function" such as the mean squared error function, mean absolute error function, log-loss function (or binary cross-entropy function), etc. In general, the loss function provides a numerical evaluation of the similarity between the neural network (200) output and the given target. In some implementations, the loss function may be composed of multiple loss functions applied to different portions of the output-target comparison. The loss function may also be constructed to impose additional constraints on the values assumed by the edges (204). For example, a loss function can include a regularization or penalty term for example, which may be physics-based, that affects or otherwise constrains the values of the edges (204). Overall, the goal of a training process is to alter the edge (204) values such that an output of the neural network (200) when processing a given input is similar to the target associated with the given input. In other words, the intent of training is to promote similarity between the neural network (200) output and associated target(s) over the data set provided for training (e.g., training data). Changes in the values of the edges (204) are guided by the loss function, typically through a process called "backpropagation."

Backpropagation consists of computing the gradient of the loss function with respect to the values of the trainable edges (204). The gradient indicates a change in the edge (204) values, that if applied to the edges (204), would result in the greatest change to the loss function with respect to training data provided when computing the gradient. The edge (204) values are typically updated by a "step" in a direction according to the gradient. The step size is often referred to as the "learning rate" and need not remain fixed during the training process. Additionally, the step size update to the edge (204) values may be informed by previously seen edge (204) values or previously computed gradients.

Updates to the edge values of a neural network (200) are applied iteratively. In other words, the training process consists of repeatedly computing the gradient of the loss function with respect to the edge (204) values and updating the edge (204) values with a step guided by the gradient. This process continues until a termination criterion is reached. For example, the termination criterion may consist of one or more of: reaching a fixed number of edge (204) updates, otherwise known as an iteration counter; noting no appreciable change in the loss function between iterations (or the change to edge values between updates being less than a predefined threshold); and reaching a specified performance metric as evaluated on the training data or a separate hold-out data set. Once the termination criterion is satisfied, and the edge (204) values are no longer intended to be updated, the neural network (200) is said to be "trained." The loss function can be constructed so that similarity between outputs and targets is increased if the loss function is increased, such that the training process can be viewed as a maximization of the loss function. Similarly, the loss function can be constructed so that similarity between outputs and targets is increased if the loss function is decreased, such that the training process can be viewed as a minimization of the loss function. The tasks of maximization and minimization can be made equivalent through techniques such as negation.

A machine-learned model architecture defines the "structure" of the machine-learned model. For example, in the case of the neural network (200), the structure is specified by the number of hidden layers in the network, the type of activation function(s) used, and the number of outputs, among other things such as the use and location of specialized layers (e.g., batch normalization layer). The architecture of a machine-learned model is specified by a set of "hyperparameters." For example, for the neural network (200), the number of hidden layers and the number of nodes (202) in each layer are hyperparameters of the neural network (200).

Another type of machine-learned model is a convolutional neural network (CNN). Similar to a neural network (200) a CNN can be thought of, or depicted as, being composed of a series of nodes connected by edges.

Figure 3A:
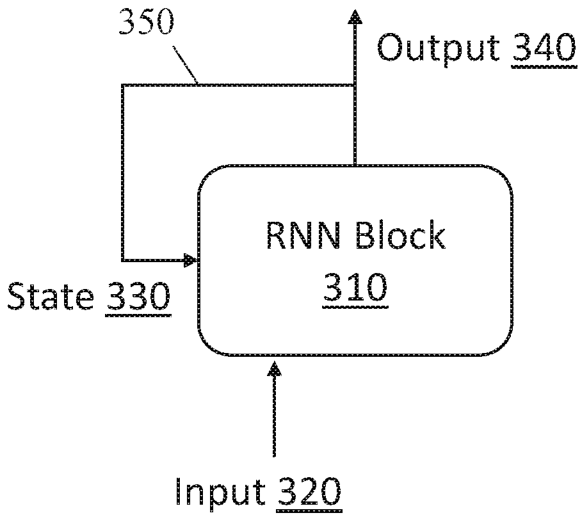
FIG. 3A depicts a recurrent neural network in accordance with one or more embodiments of the disclosure.

Yet another type of machine-learned model is a recurrent neural network (RNN), as depicted in FIG. 3A. As seen, an RNN includes an RNN Block (310) and a recurrent connection (350). The RNN Block (310) can accept an Input (320) and a State (330) and produces an Output (340). That is, the RNN Block (310) applies one or more operation (e.g., matrix multiplication) to the Input (320) and the State (330) to produce the Output (340). Further, and as will be discussed, the RNN Block (310) can alter the State (330) between inputs, or elements of an input.

The RNN Block (310) typically includes one or more data structures (e.g., matrix, array, tensor, etc.) that contain the weights or parameters of the RNN. These weights or parameters are analogous to those of the neural network (200) (e.g., edge values) or the filters of the CNN. A distinction between the data structures containing weights associated with a bias (e.g., a bias node in the terminology of a neural network) and those data structures containing weights applied to node values that change based on a received input can be made. For concision, the data structure of weights associated with bias values are referred to hereafter as a bias vector and the data structures of other weights are referred to as matrices. Additionally, a given example will consider Inputs (320) as vectors. That said, RNNs operating on high dimensional inputs (e.g. inputs with a tensor rank greater than or equal to 2) can structure weights in higher order data structures such as tensors rather than in matrices or vectors.

In one or more implementations, an RNN Block (310) has two weight matrices and a single bias vector. A commonly employed naming convention is to call one weight matrix W and the other U and to reference the bias vector as $\vec{b}$.

Keeping with FIG. 3A, the Input (320) to the RNN Block (310) is an element of a sequence. For example, consider a sequence composed of N elements (e.g. each element being a feature vector of a frame). Each element may be considered an input, indexed by n, such that the sequence may be written as sequence=[$input_1$, $input_2$, $input_n$, . . . , $input_{N-1}$, $input_N$]. In general, an Input (320) to the RNN Block (310) (e.g., input of a sequence) can be a scalar, vector (e.g., feature vector of a frame), matrix, or higher-order tensor. For the present example, each Input (320) is considered a vector with j elements, and in the case where j=1, each Input (320) is a scalar.

To process a sequence, an RNN receives the first ordered Input (320) of the sequence, $input_1$, along with a State (330), and processes them with the RNN Block (310) to produce an Output (340). In general, the Output (340) can be a scalar, vector, matrix, or tensor of any rank. For the present example, the Output (340) is considered a vector with k elements; or, in the case where k=1 the Output (340) is a scalar. The State (330) is of the same type and size as the Output (340) (e.g., a vector with k elements). For the first ordered input, the State (330) is usually initialized with all of its elements set to the value zero. For the second ordered Input (320), $input_2$, of the sequence, the Input (320) is again processed by the RNN Block (310), however, in this case the State (330) received by the RNN Block (310) is the Output (340) determined from the processing of the first ordered Input (320), $input_1$. This process of assigning the State (330) to the last produced Output (340) is depicted in FIG. 3A with the recurrent connection (350). The process of using the last Output (340) for the State (330) when processing an Input (320) that originates from an ordered sequence is applied to all Inputs (320) with the exception of the first ordered input, $input_1$. In some implementations, the Output (340) produced by the RNN Block (310) for each Input (320) within a sequence is stored for later processing and use (e.g., a final output of the RNN can be composed of the Outputs (340) produced each instance the RNN Block (310) processed an Input (320) and State (330)). In other implementations, only the Output (340) produced by the RNN Block (310) when processing the last element of a sequence (i.e., final Input (320), $input_N$) is retained.

In greater detail, and with reference to the previously stated matrix and vector labels, the process of the RNN Block (310) can generally be written as $$\text{Output} = RNN\ \text{Block(Input, State)} = f\left(U\cdot\text{State} + W\cdot\text{Input} + \vec{b}\right), \quad \text{EQ. 1}$$

where W, U, and b are the weight matrices and bias vector of the RNN Block (310), respectively, and f is an activation function such as one of those previously described with respect to the neural network (200).

Figure 3B:
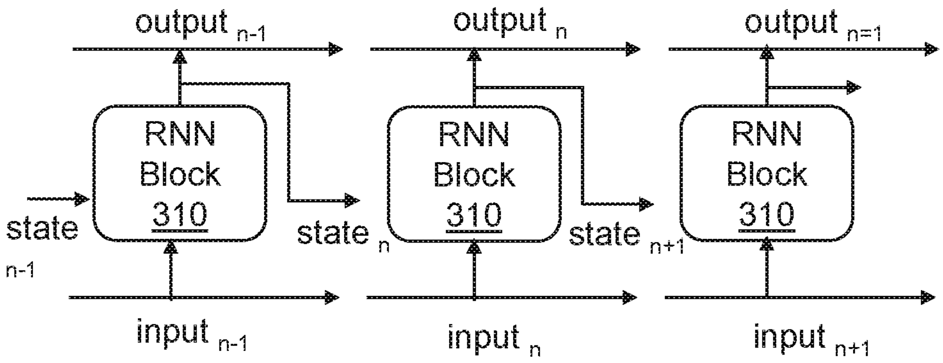
FIG. 3B depicts an unrolled recurrent neural network in accordance with one or more embodiments of the disclosure.

FIG. 3B depicts an "unrolled" version of the RNN of FIG. 3A. The unrolled depiction demonstrates how the RNN operates on sequential inputs, indexed by n, and can produce sequential outputs. The unrolled depiction further demonstrates how the state is passed through various inputs of the sequence. While the unrolled depiction shows multiple RNN Blocks (310), these blocks are the same, meaning they contain the same weight matrices and bias vector.

As previously discussed with respect to the neural network (200), training a machine-learned model such as the RNN requires that pairs of inputs and one or more targets (i.e., a training dataset) are provided to the machine-learned model along with the implementation of a training process. In the context of an RNN, the RNN receives a sequence of one or more elements (Inputs (320) and processes the sequence to form an output, which may also be a sequence. Herein, the overall output of an RNN is referred to as an RNN result. In other words, an RNN receives a sequence of one or more elements and produces an RNN result. Thus, the training procedure for an RNN consists of determining values for the weight matrices and the bias vector of the RNN Block (310) through comparison of an RNN result of the RNN produced by processing an input sequence to an associated target using a comparison function (e.g., loss function). Similar to the previously discussed neural network (200) and CNN, the comparison function is used to guide changes made to the RNN weights, typically through a process called "backpropagation through time," which is similar to the backpropagation process previously described.

Various adaptions can be made to an RNN resulting in a specific, or at least distinctly named, machine-learned model. For example, a gated recurrent network (GRU) and a long short-term memory (LSTM) network may each be considered instances of, or specific types of, an RNN. The recurrent blocks of these machine-learned models generally add additional weights (e.g., additional weight matrices, additional bias vector, etc.) to process a received input and state, and other quantities, in a more complex fashion. For example, an LSTM determines another "state-like" data structure commonly referred to as the "carry."

The ASD system (100) includes a detection model (120) composed of one more machine-learned models. For example, the detection model (120) includes a neural network (200), a CNN, and an RNN. While the machine-learned models of a neural network (200), CNN, and RNN have been given at least some description herein, other machine-learned models can be used by, or included in, the detection model (120) without limitation. For example, the detection model (120) may include a transformer (i.e., another type of machine-learned model).

Figure 4:
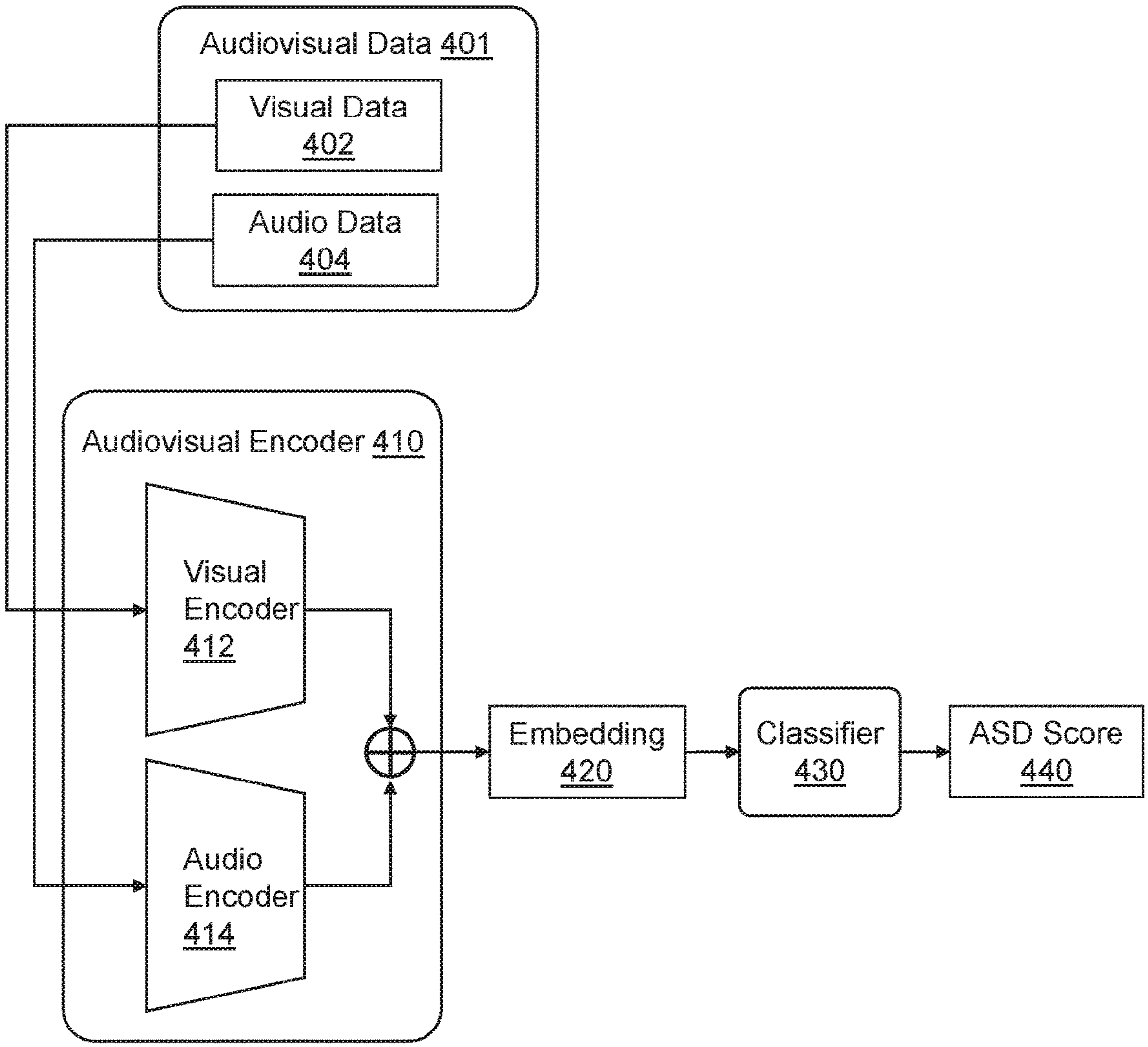
FIG. 4 depicts a speaker detection model in accordance with one or more embodiments of the disclosure.

FIG. 4 depicts the flow of audiovisual data (401) through an audiovisual encoder (410) and a classifier (430), in accordance with one or more embodiments. As will be described in greater detail later, the detection model (120) can include both the audiovisual encoder (410) and the classifier (430), however, the connections may not be as depicted in FIG. 4. The audiovisual data (401) is received as an input by the audiovisual encoder (410) and eventually transformed to ASD score (440). In other words, FIG. 4 depicts the production of an ASD score (440) given an audiovisual input. The ASD score (440) can be similar to the detection result (130) as previously described. That is, the ASD score (440) can include one or more continuous or categorical values indicative of the speaking status (e.g., "actively speaking," "not actively speaking") of each person in a visual scene. However, and as will be described below, a distinction is made between the ASD score (440) and the detection result (130) in that the detection result (130) can be formed from an aggregation of ASD scores (440).

FIG. 4 also depicts audiovisual data (401) as being composed of a visual data (402) (e.g., a sequence of frames or images) and audio data (404) (e.g., a time-series of vibrational amplitudes). In practice, the audiovisual data (401) need only include at least one of the visual data (402) and audio data (404). Further, no distinction is made between visual data (402) and audio data (404). For example, in instances where a single device includes or acts as the visual sensor (102) and the audio sensor (104) the output of the device can simply be referred to as audiovisual data (401). In other instances, audiovisual data (401) can be separated or otherwise partitioned into visual data (402) and audio data (404). As depicted in FIG. 4, the audiovisual data (401) is received as an input by the audiovisual encoder (410). The audiovisual encoder (410) processes the visual data (402) and the audio data (404) separately using a visual encoder (412) and an audio encoder (414), respectively. That is, the audiovisual encoder (410) can include a visual encoder (412) and an audio encoder (414). The visual encoder (412) the audio encoder (414) may each be a CNN. In instances where the audiovisual data (404) only includes one of visual data (402) or audio data (404), the audiovisual encoder (410) need only include, or may be considered as, a visual encoder (412) or an audio encoder (414), respectively.

In FIG. 4, which depicts the audiovisual encoder (410) as including a visual encoder (412) and an audio encoder (414), the visual encoder (412) receives the visual data (402) and produces a visual encoding and the audio encoder (414) receives the audio data (404) and produces an audio encoding. The visual encoding may be a vector of visual features (i.e., visual feature vector), one for each frame of the audiovisual data (401). The visual encoding may be a two-dimensional array (or matrix) of values. For example, if the audiovisual data (401) incudes N frames and the visual encoder (412) determines $M_v$ features for each frame, then the size of the visual encoding may be N by $M_v$ (or $M_v$ by N). The audio encoding may be a vector of audio features (i.e., audio feature vector), one for each frame of the audiovisual data (401). The audio encoding may also be a two-dimensional array (or matrix) of values. For example, if the audiovisual data (401) incudes N frames and the audio encoder (414) determines $M_a$ features for each frame, then the size of the visual encoding may be N by $M_a$ (or $M_a$ by N). The visual encoding and the audio encoding are concatenated to form an embedding (420). In alignment with the previous examples, the embedding (420) can also be a two-dimensional array (or matrix) having a size of N by ($M_v$+$M_a$).

In other embodiments, the audiovisual encoder (410) cannot be partitioned, or otherwise represented, as a visual encoder (412) and an audio encoder (414). In such cases, the audiovisual encoder (410) accepts audiovisual data (401) and produces an embedding (420). The embedding (420) is a two-dimensional array (or matrix) with a length of one dimension corresponding to the number of frames in the audiovisual data (401) and the length of the other dimension corresponding to the number of features determined for each from by the audiovisual encoder (410), where the features need not necessarily correspond to only a visual or only an audio aspect of the audiovisual data (401).

Keeping with FIG. 4, the embedding (420) is passed to a classifier (430). The classifier (430) may be an RNN that operates on the embedding as an ordered sequence of feature vectors, where the feature vectors are ordered according to their corresponding frame. The classifier returns an ASD score (440). The ASD score (440) provides an indication of whether each person in a visual scene is actively speaking. In some embodiments, the ASD score is applicable over the duration of the visual scene represented by the audiovisual data (401). That is, in some embodiments, an indication of whether a person is speaking is not determined for each frame but rather information across frames (i.e., temporal context) is used to indicate a speaking class (e.g., "actively speaking," "not actively speaking") and/or probability of speaking (e.g., a value between zero and one) for each person and that indication is associated with the entirety of the audiovisual data (401).

Figure 5:
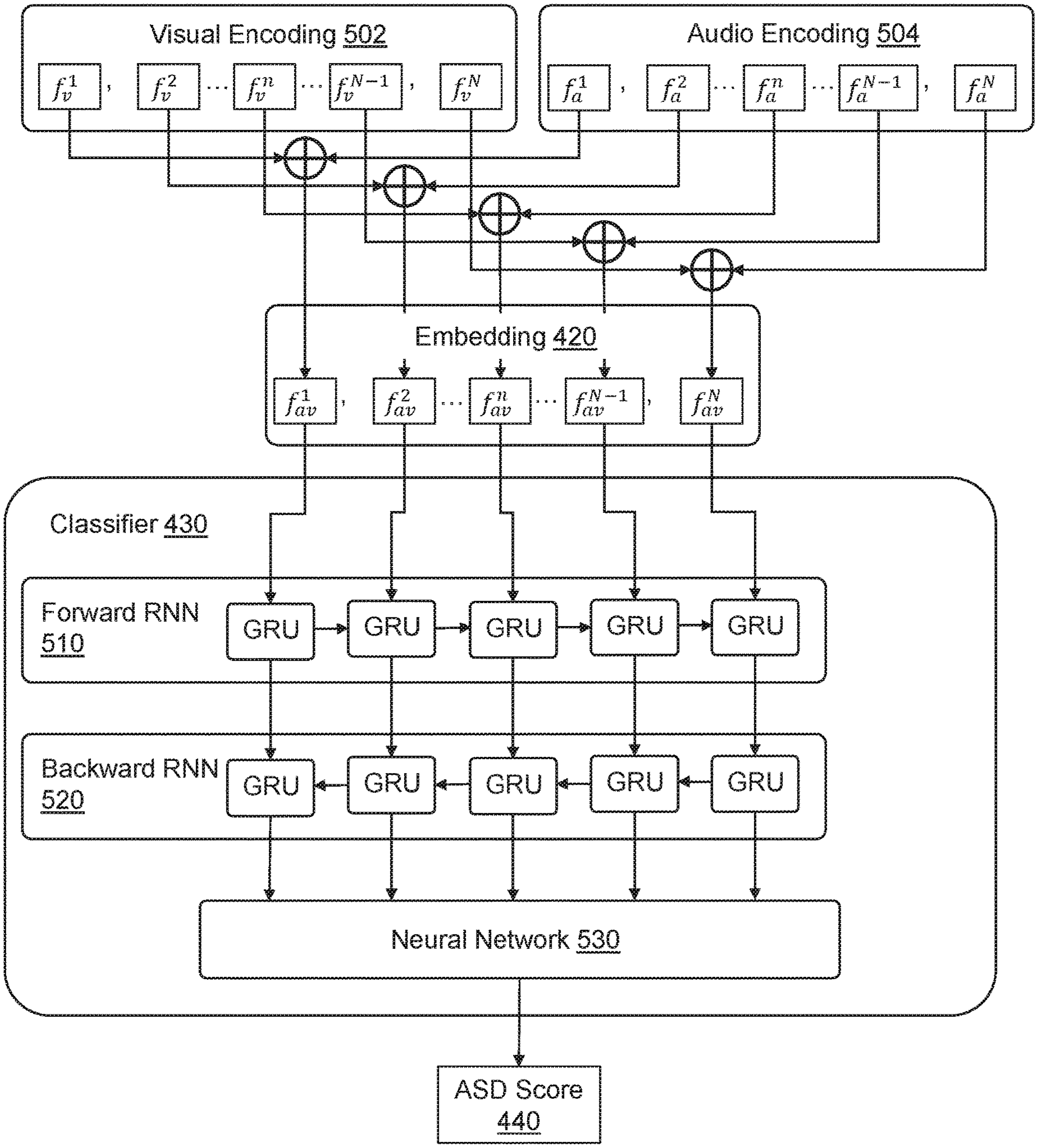
FIG. 5 depicts a concatenation operation and a classifier in accordance with one or more embodiments of the disclosure.

In accordance with one or more embodiments, FIG. 5 depicts the concatenation of a visual encoding (502) and an audio encoding (504), as returned by the audiovisual encoder (410), to form an embedding (420) in greater detail. As depicted in FIG. 5, given audiovisual data (401) with a length of N frames, an audiovisual encoder (410) (or, more specifically, a visual encoder (412)) can be used to determine a visual encoding (502). The visual encoding (502) consists of N visual feature vectors, labelled in FIG. 5 as feature vectors $$f_v^1 \text{ to } f_v^N,$$

where the subscript v indicates a visual feature vector and the superscript indicates the corresponding frame from the audiovisual data (401). Further, given audiovisual data (401) with a length of N frames, an audiovisual encoder (410) (or, more specifically, an audio encoder (414)) can be used to determine an audio encoding (504). The audio encoding (504) consists of N audio feature vectors, labelled in FIG. 5 as feature vectors $$f_a^1 \text{ to } f_a^N,$$

where the subscript a indicates an audio feature vector and the superscript indicates the corresponding frame from the audiovisual data (401).

The visual feature vectors from the visual encoding (502) and the audio feature vectors from the audio encoding (504) are concatenated, frame by frame, to form the embedding (420). In other words, the embedding (420) consists of N audiovisual feature vectors, labelled in FIG. 5 as feature vectors $$f_{av}^{1} \text{ to } f_{av}^{N},$$

where the subscript av indicates the inclusion of both audio and visual features in the vector and the superscript indicates the corresponding frame from the audiovisual data (401).

FIG. 5 further depicts the inner workings of the classifier (430). The classifier (430) includes a forward RNN (510). As depicted, the forward RNN (510) accepts the sequence of audiovisual feature vectors starting with the "first" (e.g., first frame) audiovisual feature vector and proceeding to the "last" (e.g., last frame) audiovisual feature vector. The forward RNN (510) is a gated recurrent network (GRU). FIG. 5 illustrates the forward RNN (510) "unrolled" using GRU Blocks. As depicted, the classifier (430) further includes a backward RNN (520). As depicted, the backward RNN (520) accepts the sequence of outputs produced each time the RNN Block processed an input in the forward RNN (510). However, the backward RNN (520) accepts the sequence of forward RNN (510) outputs in reverse order. The backward RNN (520) is a gated recurrent network (GRU). FIG. 5 further illustrates the backward RNN (520) "unrolled" using GRU Blocks. The classifier (430) further includes a neural network (530). The neural network (530) receives, as inputs, the sequence of outputs produced each time the RNN Block processed an input in the backward RNN (520). The neural network (530), in turn, returns the ASD score (440) for the audiovisual data (401).

The detection model (120) of the ASD system (100) described herein contains an audiovisual encoder (410) and a classifier (430) similar to those depicted in FIGS. 4 and 5. Further, the audiovisual encoder (410) has a processing time proportional to the length or number of frames in received audiovisual data (401) and the classifier (430) has a processing time invariant, or approximately invariant, to the length of the audiovisual data (401) (and thus the length of the embedding (420)). Using Big-O notation, the time complexity of the audiovisual encoder (410) is O(n), where n is the number of frames provided in the audiovisual data (401), and the time complexity of the classifier is O(1) (or constant).

Audiovisual data (401) is restricted to a predefined number of frames (e.g., 10 frames) when processed by the audiovisual encoder (410) of the detection model (120). For example, the detection model (120) can operate on an incoming (e.g., live) video stream and the audiovisual encoder (410) can be applied to process the most recent segment of N frames (e.g., 10 frames) of the video stream. Further, a predefined number of embeddings resulting from the application of the audiovisual encoder (410) on previously encountered (and processed using the audiovisual encoder (410)) segmented audiovisual data (one segment for every N frames) are concatenated and organized (e.g., ordered, spliced, etc.) according to a predefined set of rules forming one or composite embeddings. The one or more composite embeddings are then each processed by the classifier (430) returning one or more ASD scores (440). The one or more ASD scores (440) are aggregated according to a predefined aggregation function to form the detection result (130). Thus, the detection model (120) of the active speak detection (ASD) system (100) is configured such that the audiovisual encoder (410) processes periodic segments of audiovisual data (401) constrained to a fixed size while the classifier (430) operates on one or more combinations, concatenations, and/or splices of embeddings determined using the audiovisual encoder (410). A benefit of the detection model (120) that decouples the audiovisual encoder (410) and the classifier (430), as described above in accordance with one or more embodiments, is that the detection model (120) can process segments of audiovisual data quickly (i.e., in real time), due to the limited number of frames processed by the audiovisual encoder (410), and concurrently achieve high accuracy through consideration of previously determined embeddings when applying the classifier (430). Thus, the ASD system (100) described herein can accurately determine an active speaker in a visual scene in real-time. The process of using the audiovisual encoder (410) to process audiovisual data constrained to a predefined number of frames, subsequently processing one or more composite embeddings using the classifier (430), and computing a detection result (130) based on an aggregation of one or more ASD scores returned by the classifier (430) is illustrated in FIG. 6.

Figure 6:
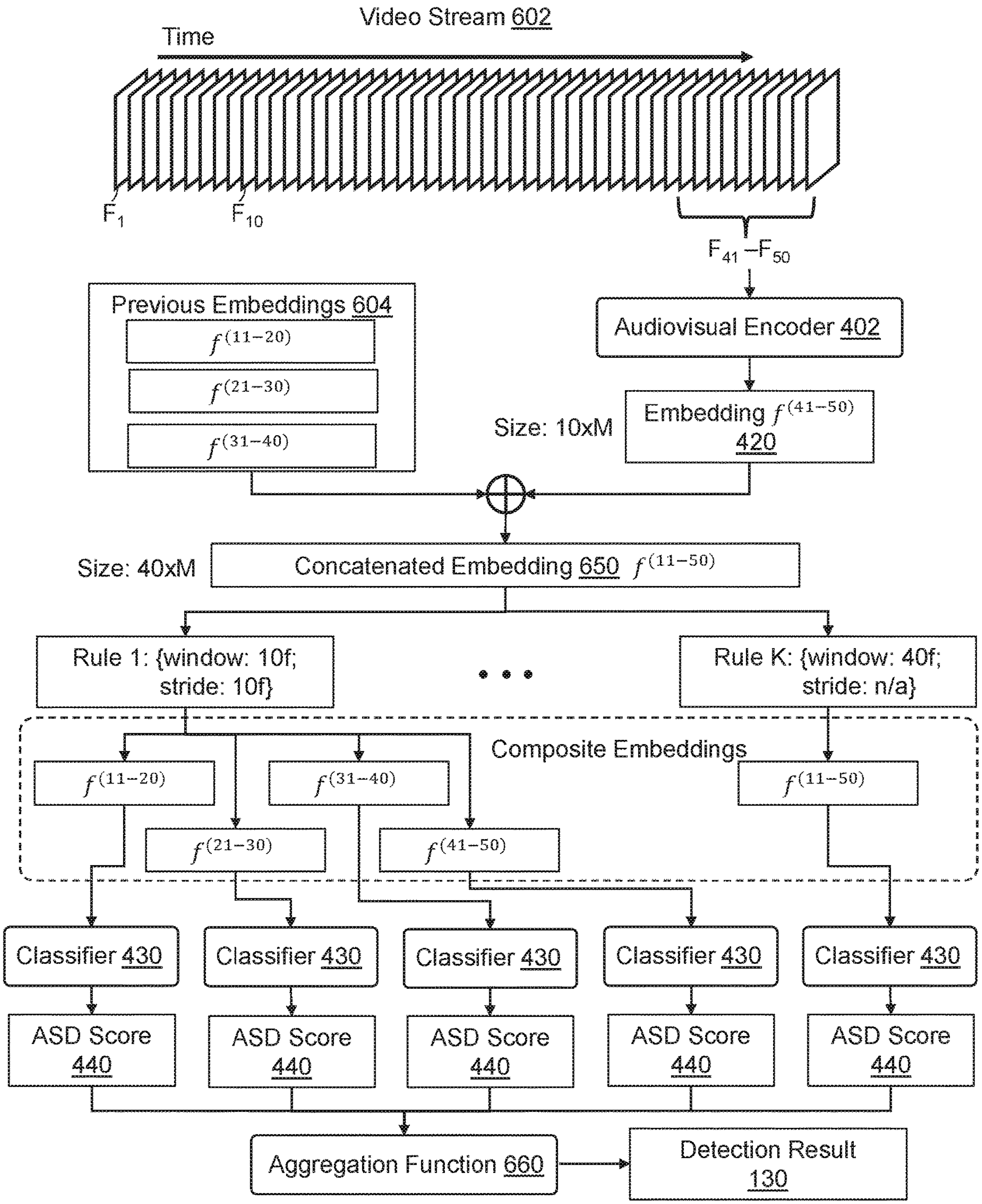
FIG. 6 is a graphical depiction of a set of configuration parameters in accordance with one or more embodiments of the disclosure.

Turning to FIG. 6, which depicts an incoming (e.g., live) video stream (602) in accordance with one or more embodiments, the video stream (602) can be acquired using one or more of a visual sensor (102) and an audio sensor (104). Further, the video stream (602) is composed of a sequence of frames (where audio data, if present, can also be segmented into frames). The frames of the video stream are numbered, where the first frame in the sequence is $F_1$, the second frame is $F_2$, and so on and so forth, for as many frames are in the video stream (602). In the instance that the video stream (602) is live, new frames may be appended to the represented video stream (602) as acquired.

The video stream (602) is segmented into consecutive sets of frames according to a predefined number that indicates the number of frames in a set. That is, the detection model (120) can be configured according to a number of frames in a set. For example, a set is formed from every 10 frames in the video stream (602). Thus, each set forms a sequence of audiovisual data having a fixed and predefined length. In the instance where the video stream (602) is live, a set of frames (or segment or sequence of audiovisual data) is formed, in real-time, as the frames are received according to the predefined number of frames in a set. In the example of FIG. 6, the predefined number of frames in a set is set to 10 frames. As seen in the example of FIG. 6, the video stream (602) currently has 50 frames, with frames $F_{41}$ to $F_{50}$ being the most recent frames, with respect to time, and forming a set. Each set of frames (forming audiovisual data) is processed by the audiovisual encoder (410). FIG. 6 depicts the audiovisual encoder (410) processing the most recent set of 10 frames ($F_{41}$ to $F_{50}$) of the video stream (602) forming an embedding (420). Because the embedding is specific to frames $F_{41}$ to $F_{50}$ the embedding can be referenced as $f^{(41\text{-}50)}$ (i.e., the audiovisual feature vectors for corresponding to frames $F_{41}$ to $F_{50}$.) The embedding $f^{(41\text{-}50)}$ can be a two-dimensional array (or matrix) having a size 10 by M, where 10 is the number corresponding frames and M is the number of features (e.g., audiovisual features) determined for each frame.

Previously determined embeddings can be stored as previous embeddings (604). For example, FIG. 6 depicts three other embeddings, $f^{(11\text{-}20)}$, $f^{(21\text{-}30)}$, and $f^{(31\text{-}40)}$ corresponding to the output of the audiovisual encoder (410) having processed audiovisual data constructed from sets of frames containing frames $F_{11}$ to $F_{20}$, $F_{21}$ to $F_{30}$, and $F_{31}$ to $F_{40}$, respectively. Not all previously determined embeddings need to be retained as previous embeddings (604). For example, in the depiction of FIG. 6, the embedding $f^{(1\text{-}10)}$ corresponding to frames $F_1$ to $F_{10}$, having been previously determined using the audiovisual encoder (410), is not retained in the previous embeddings (604). The detection model (120) is configured by a number of retained embeddings. Further, in instances where the number of determined embeddings, through application of the audiovisual encoder (410) to sets of frames (forming audiovisual data segments), exceeds the number of retained embeddings, the "oldest" (or first computed) embedding is dropped out otherwise removed and replaced by the "newest" (or more recently computed) embedding. That is, the previous embeddings (604) retains embeddings according to a first in, first out (FIFO) strategy. For example, in the case where the number of retained embeddings is three, such as depicted in FIG. 6, and a new set of ten frames corresponding to newly acquired frames $F_{51}$ to $F_{60}$ is acquired, then the previous embeddings (604) can contain embeddings $f^{(21\text{-}30)}$, $f^{(31\text{-}40)}$, and $f^{(41\text{-}50)}$.

Continuing with the example of FIG. 6, the previous embeddings (604) and the most recently determined embedding (e.g., $f^{(41\text{-}50)}$) are concatenated to form a concatenated embedding (650). In the example of FIG. 6, the concatenated embedding is a two-dimensional array (or matrix) with a size of 40 by M.

The concatenated embedding (650) is processed according to one or more rules where the application of each rule results in one or more composite embeddings that can be passed as an input to the classifier (430) of the detection model (120). In some embodiments, the one or more rules can be applied to one or more of the previous embeddings (604) and the most recent embedding without the need to form a concatenated embedding (650). That is, in practice, the step of forming a concatenated embedding (650) can be skipped although it is depicted in FIG. 6 to promote understanding. In general, the detection model (120) can be configured with K rules, where K is an integer greater than or equal to one. Each rule specifies a process for forming at least one composite embedding that is passed to the classifier to obtain an ASD score. For example, a rule can specify a window and a stride where a composite embedding is formed from the audiovisual feature vectors enclosed by the window applied to the concatenated embedding (650) and the window is moved through, or slid over, the audiovisual feature vectors of the concatenated embedding. For example, a first rule (i.e., Rule 1) specifies a window size of 10 frames and a stride of 10 frames. Using the concatenated embedding (650) of FIG. 6 as an example, the example concatenated embedding (650) containing the audiovisual feature vectors for frames 11 through 50 (i.e., embedding $f^{(11\text{-}50)}$), application of the first rule would split the concatenated embedding into composite embeddings $f^{(11\text{-}20)}$, $f^{(21\text{-}30)}$, $f^{(31\text{-}40)}$, and $f^{(41\text{-}50)}$. The application of the first rule to the concatenated embedding (650) is depicted in FIG. 6. As another example, a second rule may specify a windows size of 20 frames and a stride of 5 frames. Application of the second rule to the example concatenated embedding (650) of FIG. 6 would result in the composite embeddings $f^{(11\text{-}30)}$, $f^{(16\text{-}35)}$, $f^{(21\text{-}40)}$, $f^{(26\text{-}45)}$, and $f^{(31\text{-}50)}$ (not shown in FIG. 6). As another example, a $K^{th}$ rule (Rule K) may specify a window size of 40 frames. In this case, because the example concatenated embedding (650) itself only contains 40 frames worth of audiovisual feature vectors, a stride need not be specified and application of this rule simply returns the concatenated embedding (650) itself (i.e., $f^{(11\text{-}50)}$) as a composite embedding. Any other rule, including those with different operating mechanisms than specifying a window size and a stride, can be applied to the concatenated embedding (650) as long as application of the rule returns one or more composite embeddings, or embedding representations, that can be processed by the classifier (430).

As depicted in FIG. 6, the resultant composite embeddings, or embedding representations, produced by application of the rules 1 through K (where K≥1) to the concatenated embedding (650) are each independently processed by the classifier (430). Processing a given composite embedding with the classifier (430) results in an ASD score (440). Thus, the detection model (120) produces at least one ASD score (440). As depicted in FIG. 6, the one or more ASD scores are aggregated according to an aggregation function (660) to determine the detection result (130). Consider a vector V of length K where the $k^{th}$ element in the vector V indicates the number of composite embeddings returned though application of the $k^{th}$ rule to the concatenated embedding (650). For example, in the example depicted in FIG. 6, application of Rule 1 returns four composite embeddings and application of Rule K returns one composite embedding. Thus, in this case, the vector V would be as follows: [4, . . . , 1]. Further, an element of the vector V can be specified as $V_k$. Additionally, the ASD score determined by processing the $(V_k)^{th}$ composite embedding developed using the $k^{th}$ rule can be referenced as $$s_k^{(V_k)}.$$

Using this notation, in one or more embodiments, the aggregation function (660) is a simple average across all ASD scores given as $$\text{Detection Result} = \frac{\sum_{k=1}^{K}\sum_{j=1}^{V_k} s_k^{(V_k)}}{\sum_{k=1}^{K} V_k}. \quad \text{EQ. 2}$$

In one or more embodiments, the aggregation function is the average of the ASD scores after being averaged over each rule, or, mathematically $$\text{Detection Result} = \frac{1}{K}\sum_{k=1}^{K}\frac{\sum_{j=1}^{V_k} s_k^{(V_k)}}{V_k}. \quad \text{EQ. 3}$$

Other aggregation functions can be applied without limitation.

The example of FIG. 6 depicts an instance where the number of sets of frames that have been processed by the audiovisual encoder (410) already exceed the stated number of embeddings retained. In instances where the number of sets of frames that have been processed by the audiovisual encoder (410) do not yet equal or exceed the number of frames specified to be retained, one or more of the rules for manipulating the concatenated embedding (450) may not be applicable. For example, in the instance where only the first 10 frames of a video stream (602) are available, the previous embeddings (604) would not contain any embeddings. Further, application of the example first rule, as described above, would simply return the audiovisual feature vectors for the first 10 frames (i.e., $f^{(1\text{-}10)}$). Further, the example $K^{th}$ rule, given above, would not be applicable. Rules are applied as and where applicable.

While FIG. 6 depicts an instance where a detection result (130) is formed from a given set of frames ($F_{41}$ to $F_{50}$) in view of the embeddings of previously processed sets of frames (e.g., set $F_{11}$ to $F_{20}$, set $F_{21}$ to $F_{30}$, and set $F_{31}$ to $F_{40}$), it is emphasized that the detection model (120) can be applied to any set of frames while considering the embeddings of previously determined sets of frames, if any. Thus, a detection result can be determined for any set of frames. In general, the detection model (120) can be configured to operate on a set of N frames in view of J previously obtained embeddings, if available. For example, for a set of frames $F_i$ to $F_{i+N}$, the detection model (120) returns a detection result (130) by processing frames $F_i$ to $F_{i+N}$ with the audiovisual encoder (410) to get the embedding $f^{(i \text{ to } (i+N))}$, forms a concatenated embedding $f^{((i-JN) \text{ to } (i+N))}$, processes the concatenated embedding according to one or more predefined rules resulting in one or more composite embeddings, processes each composite embedding with the classifier (430) to get an ASD score (440), and aggregates the ASD scores (440) with an aggregation function (660). In general, the detection model (120) can be applied to a set of frames as it is obtained while storing zero or more prior embeddings determined from previously obtained sets of frames.

Figure 7:
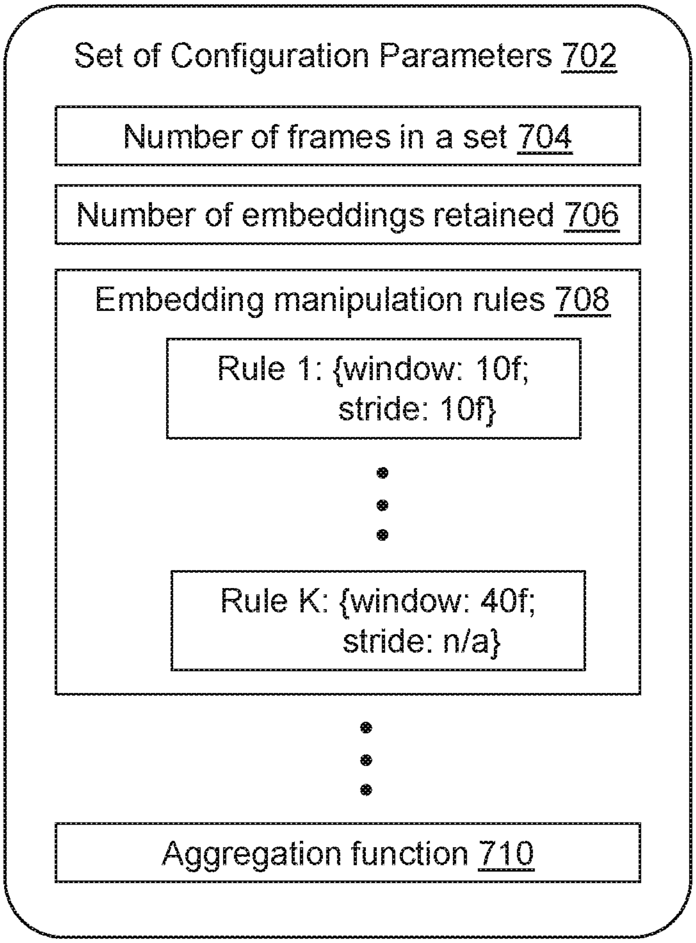
FIG. 7 depicts an example usage of a system of the disclosure applied to an incoming video stream in accordance with one or more embodiments.

Configuration of the detection model (120), or more generally the ASD system (100), is defined through a set of configuration parameters. The set of configuration parameters (702) is depicted in FIG. 7. The set of configuration parameters defines, among other things, the number of frames in a set (704) of audiovisual data that is processed at a given time by the audiovisual encoder (410), the number of embeddings retained (706) and included in the previous embeddings (604), the definitions for all the embedding manipulation rules (708), and the definition of the aggregation function (710). Other configuration parameters that govern the behavior of the ASD system (100) can be included in the set of configuration parameters (702).

The ASD system (100) further includes a speaker detection logic that alters or augments a detection result based on one or more previously determined or historical detection results. That is, in determining whether a person is actively speaking, the ASD system (100) can further make that determination in view of the person's past active speaking history. The detection result includes a speaking metric for each person in a visual scene. The speaking metric is a quantitative indication of whether a person in a visual scene is speaking. For example, the speaking metric may be a probability that a person is speaking. Thus, the speaking metric, as obtained from the detection result, for each person can be compared to a threshold to determine whether a person is speaking. The threshold can be predefined by a user (e.g., set by an operator, manager, or system administrator providing or using the ASD system (100)), customized on the fly (e.g., selected or adapted by a user while using the ASD system (100)), or selected or determined based on a given context (e.g., dependent on the audiovisual data (401) or embedding (420), dependent on a number of persons in the visual scene, etc.). For example, the threshold can be assigned a predefined value based on a determined, or user-provided, number of persons in the visual scene.

A status is associated with each person. The status of each person can be one of "Active" and "Inactive," where these statuses indicate that a person is detected as speaking (or actively speaking) and that the person is not speaking (or not actively speaking), respectively. The speaker detection logic of FIG. 8 determines a status for each speaker based on both the detection result (i.e., a quantitative indication of whether each person is speaking) and the last known status of each person. Initially, the status of every person in a visual scene is set to "Inactive."

Figure 8:
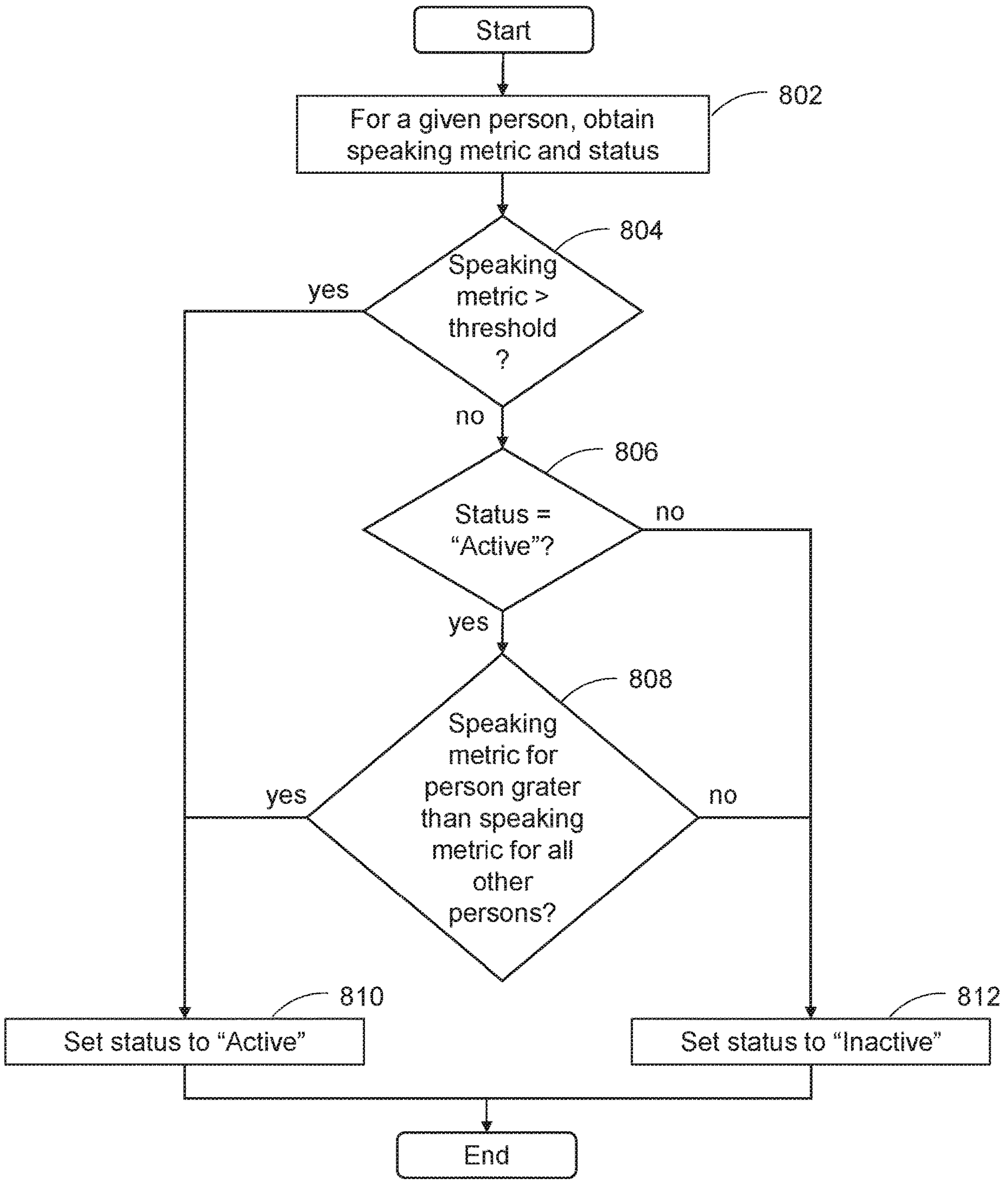
FIG. 8 depicts a flowchart in accordance with one or more embodiments of the disclosure.

Turning to FIG. 8, in Block 802, a person's speaking metric and status are obtained, where the status is the last known status of the person and is initially set to "Inactive." In Block 804, the speaking metric for the person is compared to a threshold. If the speaking metric (e.g., probability that the person is speaking) is greater than the detection threshold, then the speaker detection logic of FIG. 8 proceeds to Block 810. In Block 810 the status of the given person is set to "Active" and the person is thus detected to be actively speaking. The threshold can be predefined by a user, customized on the fly, or selected or determined based on a given context.

If, however, in Block 804 the speaking metric of the person is less than or equal to the threshold the speaker detection logic of FIG. 8 proceeds to Block 806. In Block 806 it is checked whether the current status of the given person is "Active." If the current status of the person is not active, the speaker detection logic of FIG. 8 continues to Block 812 where the person's status remains as "Inactive." If the current status of the person is "Active" then the speaker detection logic of FIG. 8 proceeds to Block 808. In Block 808 the speaking metric for the given speaker is compared to the speaking metrics of all other persons in the visual scene. If the speaking metric for the given person is greater than the speaking metric of all other persons, then the person's status is retained as "Active" as indicated by Block 810. If, however, another person in the visual scene has a speaking metric greater than the speaking metric of the given person, the status of the given person is set to "Inactive" in Block 812.

Figure 9:
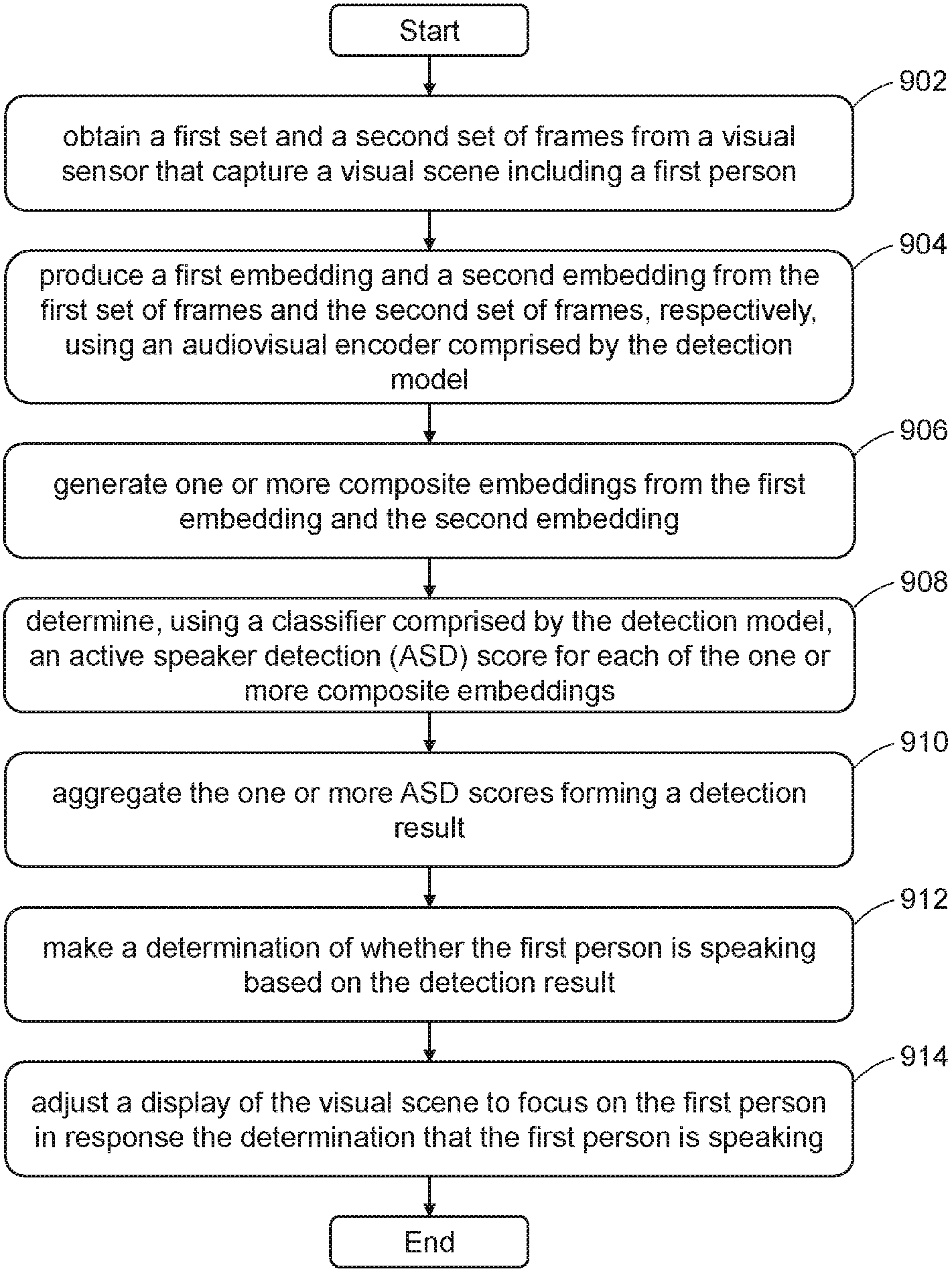
FIG. 9 depicts a method for detecting an active speaker in accordance with one or more embodiments of the disclosure.

FIG. 9 depicts a method in accordance with one or more embodiments. As depicted, in Block 902 a first set of frames and a second set of frames are obtained from a visual sensor (e.g., a camera). The visual sensor captures a visual scene that includes at least a first person. The second set of frames are captured by the visual sensor after, with respect to time, the first set of frames. For example, the visual sensor may produce a video stream. The first set of frames could include frames $F_1$ to $F_{10}$ and the second set of frames could include frames $F_{11}$ to $F_{20}$.

In Block 904, each of the first and second set of frames are processed by an audiovisual encoder to produce a first embedding and a second embedding, respectively. The first set of frames is processed by the audiovisual encoder once obtained without yet having obtained the second set of frames. Similarly, the second set of frames can be processed by the audiovisual encoder once received. That is, Blocks 902 and 904 need not be executed in a strictly sequential order but can be executed in parallel.

In Block 906, one or more embedding manipulation rules are applied to the first embedding and the second embedding (or, a concatenated embedding formed from, at least, the first embedding and the second embedding). The application of an embedding manipulation rule forms at least one composite embedding. Thus, the application of one or more embedding manipulation rules to the first and second embeddings forms one or more composite embeddings. An embedding manipulation rule prescribes a size of a window and a stride length for extracting splices (or windows) from a concatenated embedding formed from, at least, the first embedding and the second embedding.

In Block 908, each of the one or more composite embeddings are processed by a classifier and each, upon processing with the classifier, results in an active speaking detection (ASD) score. An ASD score includes a probability that given person is speaking for each person in a visual scene, including the first person.

In Block 910, the one or more ASD scores (one resulting from each of the one or more composite embeddings) are aggregated according to an aggregation function forming a detection result. The aggregation function averages the probability that a person is speaking, across all the ASD scores, for each person. The detection result includes a speaking metric, which is a quantitative measure of whether a person is speaking, for each person in the visual scene, including the first person.

In Block 912, a determination is made as to whether the first person is speaking based on the detection result. This determination is made by comparing the speaking metric for the first person to a threshold. In some embodiments, the determination is further based on a current speaking status of the first person and a comparison of the speaking metric of the first person and the speaking metric(s) of all other persons in the visual scene, if any.

In Block 914, in response to a determination that the first person is speaking, a display of the visual scene is adjusted to give focus to the first person. For example, a display of the visual scene may frame, or zoom in on, only the first person.

Embodiments of the disclosure have one or more of the following advantages. Embodiments of the disclosure may provide real-time and highly accurate ASD. In accordance with one or more embodiments, the real-time and high accuracy ASD is achieved by: 1) processing, in real-time, a constrained number of frames (e.g., 10 frames at a time as received) using an audiovisual encoder (i.e., forming a current embedding); 2) retaining some number of previously processed and embedded sets of frames (i.e., previous embeddings); 3) applying a classifier to one or more combinations, splices, or windows of the current embedding and one or more previous embeddings; and 4) aggregating the results of the classifier. In other words, because the audiovisual encoder processes a constrained number of frames, it can produce an embedding for a given set of frames in real time. However, the classifier has access to, and processes on, previous embeddings and thus can integrate greater temporal context when determining an ASD score.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. An active speaker detection system, comprising:
- a visual sensor configured to capture a visual scene including a first person; and
- a computer system comprising:
  - one or more computer processors; and
  - a detection model comprising an audiovisual encoder and a classifier, wherein the computer system is communicably coupled to the visual sensor and configured to:
  - obtain a first set of frames and a second set of frames from the visual sensor, wherein the second set of frames are temporally after the first set of frames,
  - produce a first embedding and a second embedding from the first set of frames and the second set of frames, respectively, using the audiovisual encoder,
  - concatenate the first embedding and the second embedding to form a concatenated embedding,
  - generate a plurality of composite embeddings from the concatenated embedding,
  - determine, using the classifier, an active speaker detection (ASD) score for each of the plurality of composite embeddings,
  - aggregate, using an aggregation function, the ASD scores forming a detection result,
  - determine whether the first person is speaking based on the detection result, and
  - upon determining that the first person is speaking, adjust a display of the visual scene to focus on the first person.

2. The active speaker detection system according to claim 1, wherein the determination of whether the first person is speaking corresponds to the second set of frames.

3. The active speaker detection system according to claim 1, wherein
- the first embedding and the second embedding each comprise a number of audiovisual feature vectors, and
- the number of audiovisual feature vectors is equal to a number of frames in the first set or the second set.

4. The active speaker detection system according to claim 1, wherein the audiovisual encoder comprises a neural network and the classifier comprises a recurrent neural network.

5. The active speaker detection system according to claim 1, wherein
- the detection result comprises a first speaking metric for the first person,
- the determination of whether the first person is speaking comprises comparing the first speaking metric to a threshold, and
- the first person is determined to be speaking in response to the first speaking metric being greater than the threshold.

6. The active speaker detection system according to claim 5, wherein
- the visual scene further includes a second person and the detection result further comprises a second speaking metric for the second person, and
- the determination of whether the first person is speaking further comprises:
  - obtaining a status for the first person in response to the speaking metric of the first person being lower than or equal to the threshold; and
  - determining whether the first speaking metric is greater than the second speaking metric and the whether the status of the first person is active,
  - wherein the first person is determined to be speaking in response to the status of the first person being active and the first speaking metric being greater than the second speaking metric.

7. A method for determining whether a first person is speaking in a visual scene including the first person, the method comprising:
- obtaining a first set of frames and a second set of frames from a visual sensor that captures the visual scene, wherein the second set of frames are temporally after the first set of frame;
- producing, with an audiovisual encoder, a first embedding and a second embedding from the first set of frames and the second set of frames, respectively;
- concatenating the first embedding and the second embedding to form a concatenated embedding;
- generating a plurality of composite embeddings from the concatenated embedding;

determining, using a classifier, an active speaker detection (ASD) score for each of the plurality of composite embeddings;

aggregating, using an aggregation function, the ASD scores forming a detection result;

determining whether the first person is speaking based on the detection result; and adjusting a display of the visual scene to focus on the first person in response to the determination that the first person is speaking.

8. The method according to claim 7, wherein the determination of whether the first person is speaking corresponds to the second set of frames.

9. The method according to claim 7, wherein the first embedding and the second embedding each comprise a number of audiovisual feature vectors, and the number of audiovisual feature vectors is equal to a number of frames in the first set or the second set.

10. The method according to claim 7, wherein the audiovisual encoder comprises a neural network and the classifier comprises a recurrent neural network.

11. The method according to claim 7, wherein the detection result comprises a first speaking metric for the first person, the determination of whether the first person is speaking comprises comparing the first speaking metric to a threshold, and the first person is determined to be speaking in response to the first speaking metric being greater than the threshold.

12. The method according to claim 11, wherein the visual scene further includes a second person and the detection result further comprises a second speaking metric for the second person, and the determination of whether the first person is speaking further comprises:

obtaining a status for the first person in response to the speaking metric of the first person being lower than or equal to the threshold; and determining whether the first speaking metric is greater than the second speaking metric and the whether the status of the first person is active, wherein the first person is determined to be speaking in response to the status of the first person being active and the first speaking metric being greater than the second speaking metric.

13. A non-transitory computer-readable medium comprising computer-executable instructions that, when executed on a computer processor, cause the computer processor to perform:

obtaining a first set of frames and a second set of frames from a visual sensor that captures a visual scene, wherein the visual scene includes a first person, wherein the second set of frames are temporally after the first set of frames;

producing, with an audiovisual encoder, a first embedding and a second embedding from the first set of frames and the second set of frames, respectively;

concatenating the first embedding and the second embedding to form a concatenated embedding;

generating a plurality of composite embeddings from the concatenated embedding;

determining, using a classifier, an active speaker detection (ASD) score for each of the plurality of composite embeddings;

aggregating, using an aggregation function, the ASD scores forming a detection result;

determining whether the first person is speaking based on the detection result; and adjusting a display of the visual scene to focus on the first person in response to the determination that the first person is speaking.

14. The non-transitory computer-readable medium according to claim 13, wherein the determination of whether the first person is speaking corresponds to the second set of frames.

15. The non-transitory computer-readable medium according to claim 13, wherein the first embedding and the second embedding each comprise a number of audiovisual feature vectors, and the number of audiovisual feature vectors is equal to a number of frames in the first set or the second set.

16. The non-transitory computer-readable medium according to claim 13, wherein the detection result comprises a first speaking metric for the first person, the determination of whether the first person is speaking comprises comparing the first speaking metric to a threshold, and the first person is determined to be speaking in response to the first speaking metric being greater than the threshold.

17. The non-transitory computer-readable medium according to claim 16, wherein the visual scene further includes a second person and the detection result further comprises a second speaking metric for the second person, and the determination of whether the first person is speaking further comprises:

obtaining a status for the first person in response to the speaking metric of the first person being lower than or equal to the threshold; and determining whether the first speaking metric is greater than the second speaking metric and the whether the status of the first person is active, wherein the first person is determined to be speaking in response to the status of the first person being active and the first speaking metric being greater than the second speaking metric.

* * * * *